US007368485B2

United States Patent
Noutary

(10) Patent No.: US 7,368,485 B2
(45) Date of Patent: May 6, 2008

(54) PRINTING INK

(75) Inventor: Carol Noutary, Kent (GB)

(73) Assignee: Sericol Limited, Broadstairs, Kent (GB)

( * ) Notice: Subject to any disclaimer, the term of this patent is extended or adjusted under 35 U.S.C. 154(b) by 0 days.

(21) Appl. No.: 10/470,436

(22) PCT Filed: Jan. 29, 2002

(86) PCT No.: PCT/GB02/00368

§ 371 (c)(1),
(2), (4) Date: Mar. 15, 2004

(87) PCT Pub. No.: WO02/061001

PCT Pub. Date: Aug. 8, 2002

(65) Prior Publication Data

US 2004/0145639 A1     Jul. 29, 2004

(30) Foreign Application Priority Data

Jan. 29, 2001  (GB) ................................ 0102227.6

(51) Int. Cl.
*C09D 11/10* (2006.01)
*C09D 11/02* (2006.01)

(52) U.S. Cl. ........................ 522/39; 522/42; 522/37; 522/64; 522/181; 522/74; 522/81; 522/83; 522/75

(58) Field of Classification Search .............. 522/39, 522/42, 37, 64, 181, 74
See application file for complete search history.

(56) References Cited

U.S. PATENT DOCUMENTS

| 4,303,924 A | 12/1981 | Young, Jr. |
| 5,262,450 A | 11/1993 | Vara |
| 5,804,301 A | 9/1998 | Curatolo |
| 5,888,649 A | 3/1999 | Curatolo et al. ............ 428/352 |

FOREIGN PATENT DOCUMENTS

| EP | 0 511 860 A1 | 11/1992 |
| EP | 540 203 | 5/1993 |
| EP | 779 346 | 6/1997 |
| EP | 0997 508 A1 | 5/2000 |
| GB | 1 414 065 | 11/1975 |
| GB | 2 255 778 | 11/1992 |
| GB | 2 256 874 | 12/1992 |
| JP | 59 179 570 | 10/1984 |
| JP | 09-183927 | 12/1995 |
| WO | WO 00/31189 | 6/2000 |

OTHER PUBLICATIONS

English Abstract of JP 59 179 570 dated Oct. 12, 1984.
Brochure "Rapi-Cure Vinyl Ethers, Reactive Agents for Radiation Curing Systems" International Speciality Products (ISP) 1995.
Russell, Gary "Vinyl ethers fulfil their early Promise," ISP, PPCJ, Jan. 1995 Wiley, John and Sons, "Chemistry & Technology of UV & EB Formulation for Coatings, Inks nd Paints", vol. II, Ed. G. Webster, 1997.
Vara, F. J. et al.,"Vinyl Ethers: Key Monomers for Radiation Curable Coatings," Radtech Europe '93 Mediterraneo, Conference Proceedings, 1993.
Schwalm, R. et al., "Vinyl Ethers in UV Curing: Copolymers with Acrylates and Unsaturated Polyesters," RadTech Europe 99, Nov. 1999.
Denness, James, Opposition by Sun Chemical Corp. to EP Patent No. 1358283 in the name of Sericol Limited, Jun. 2005.
Aldrich Catalog, p. 821; www.sigma-aldrich.com.
The Printing Ink Manual, 5th Ed. 1999, Kluwer Academic Publishers, pp. 599-603.

*Primary Examiner*—Susan Berman
(74) *Attorney, Agent, or Firm*—Duane Morris LLP

(57) ABSTRACT

Inks are disclosed which are used in ink-jet printing. The inks are cured by ultraviolet radiation, preferably free radical initiation. The inks contain a (meth)acrylate monomer, an $\alpha,\beta$-unsaturated ether monomer and a photoinitiator. The inks exhibit a low viscosity and give tough printed images after curing.

19 Claims, No Drawings

PRINTING INK

CROSS-REFERENCES TO RELATED APPLICATIONS

This is a National Phase Patent Application of PCT/GB02/00368 filed Jan. 29, 2002 which claims priority of Great Britain Application No. 0102227.6 filed Jan. 29, 2001, the complete disclosure of which is hereby incorporated by reference.

This invention concerns inks for use in ink-jet printers. In particular, this invention concerns inks for use in ink-jet printers that are cured using ultraviolet radiation.

In ink-jet printing, minute droplets of black or coloured ink are ejected in a controlled manner from one or more reservoirs or printing heads through narrow nozzles on to a substrate which is moving relative to the reservoirs. The ejected ink forms an image on the substrate. For high-speed printing, the inks must flow rapidly from the printing heads, and, to ensure that this happens, they must have in use a low viscosity, typically below 50 mPas at 25° C. although in most applications the viscosity should be below 25 mPas. Typically, when ejected through the nozzles, the ink has a viscosity of 10.5 mPas at the jetting temperature which is usually elevated to about 40° C. (the ink might have a much higher viscosity at ambient temperature). The inks must also be resistant to drying or crusting in the reservoirs or nozzles. For these reasons, ink-jet inks for application at or near ambient temperatures are commonly formulated to contain a large proportion of a mobile liquid vehicle or solvent. In one common type of ink-jet ink this liquid is water—see for example the paper by Henry R. Kang in the Journal of Imaging Science, 35(3), pp. 179-188 (1991). In those systems, great effort must be made to ensure the inks do not dry in the head due to water evaporation. In another common type the liquid is a low-boiling solvent or mixture of solvents—see, for example, EP 0 314 403, EP 0 424 714 and GB9927247.8. Unfortunately, ink-jet inks that include a large proportion of water or solvent cannot be handled after printing until the inks have dried, either by evaporation of the solvent or its absorption into the substrate. This drying process is often slow and in many cases (for example, when printing on to a heat-sensitive substrate such as paper) cannot be accelerated.

Another type of ink-jet ink contains unsaturated organic compounds, termed monomers, which polymerise by irradiation, commonly with ultraviolet light, in the presence of a photoinitiator. This type of ink has the advantage that it is not necessary to evaporate the liquid phase to dry the print; instead the print is exposed to radiation to cure or harden it, a process which is more rapid than evaporation of solvent at moderate temperatures. These monomers may be acrylate or methacrylate esters, as is disclosed in EP 0540203B, U.S. Pat. No. 5,270,368 and in WO 97 31071. In such ink-jet inks it is necessary to use monomers possessing a low viscosity. In practice it is difficult to find (meth)acrylate monomers or combinations of (meth)acrylate monomers which do not give compositions with an unacceptably high viscosity for ink-jet printing. This is especially true if materials are selected with more than one polymerisable functional group in the molecule, though these monomers have the advantage of giving a more cross-linked, and therefore tougher, polymer after irradiation. Thus, there is a restriction on the selection of the higher molecular weight multifunctional (meth)acrylates which are generally more viscous but which, other things being equal, give after polymerisation more resistant films. In practice monofunctional acrylate monomers need to be used with multifunctional acrylate monomers to arrive at a suitably low viscosity for ink-jet printing. However, this tends to reduce the cure speed and decreases the cross-link density which affects properties such as adhesion and toughness.

There is therefore a requirement in the art for the provision of an alternative to monofunctional acrylate monomers, so that an appropriately low viscosity can be obtained without loss of physical and chemical properties.

Other known low viscosity photopolymerisable monomers have been used in ink-jet inks e.g. vinyl ethers, as disclosed in EP 0 779 346. In this case the vinyl ether is used as a cationic photopolymerisable monomer. However, vinyl ethers have the drawback that cationic curing tends to be slow compared with radical systems.

Accordingly, the present invention provides an ink-jet ink which is substantially free of water or volatile organic solvents, including at least one multifunctional (meth)acrylate monomer, at least one $\alpha,\beta$-unsaturated ether monomer, at least one radical photoinitiator and at least one colouring agent, the ink having a viscosity of less than 100 mPas at 25° C.

The applicant has found that using $\alpha,\beta$-unsaturated ethers as photopolymerisable monomers in radical systems together with one or more multifunctional (meth)acrylate monomers achieves low viscosity inks with good cure speeds suitable for ink-jet printing. These systems also give acceptable end-user properties such as good cure, adhesion and chemical resistance.

Preferably the ink includes, by weight, from 2 to 15 (particularly preferably 5 to 15) parts of multifunctional (meth)acrylate monomer to 1 part of $\alpha,\beta$-unsaturated ether monomer.

Preferably the multifunctional acrylate monomer is selected from hexanediol diacrylate, trimethylolpropane triacrylate, pentaerythritol triacrylate, polyethyleneglycol diacrylate, for example, tetraethyleneglycol diacrylate), dipropyleneglycol diacrylate, tri(propylene glycol) triacrylate, neopentylglycol diacrylate, bis(pentaerythritol) hexaacrylate, and the acrylate esters of ethoxylated or propoxylated glycols and polyols, for example, propoxylated neopentyl glycol diacrylate, ethoxylated trimethylolpropane triacrylate, and mixtures thereof. Particularly preferred are difunctional acrylates with a molecular weight greater than 200.

Esters of methacrylic acid (i.e. methacrylates) can be, for example, hexanediol dimethacrylate, trimethylolpropane trimacrylate, triethyleneglycol dimethacrylate, diethyleneglycol dimethacylate, ethyleneglycol dimethacrylate, 1,4-butanediol dimethacrylate.

Mixtures of (meth)acrylates may be used.

Preferably the multifunctional (meth)acrylate monomer is present in an amount from 50 to 95% by weight, preferably from 60 to 80% by weight.

Preferably the ink is substantially free from monofunctional (meth)acrylate monomers, although small amounts may be tolerated.

When present, the monofunctional (meth)acrylate monomers are preferably the esters of acrylic acid, for example octyl acrylate, decyl acrylate, isobornyl acrylate, phenoxyethyl acrylate, tetrahydrofuryl acrylate, 2-(2-ethoxyethoxy)ethylacrylate, and mixtures thereof.

One or more $\alpha,\beta$-unsaturated ether monomers must be present in the composition of the present invention. Examples of $\alpha,\beta$-unsaturated ether monomers are vinyl ether monomers, such as triethylene glycol divinyl ether, diethylene glycol divinyl ether, 1,4-cyclohexanedimethanol divinyl ether and ethylene glycol monovinyl ether, as well as ethyl-1 propenyl ether, triethyleneglycol methyl propenyl ether, triethyleneglycol methyl vinyl ether and 2-cyclopenten-1-yl ether. Mixtures of α,β-unsaturated ether monomers may be used. The proportion of multifunctional α,β-unsaturated ether monomer is preferably between 1 and 20% by weight, more preferably between 7 and 15%, provided that the ratio of acrylate monomer to α,β-unsaturated ether monomer lies between 5:1 and 15:1. Preferably multifunctional, more preferably difunctional and trifunctional α,β-unsaturated ether monomers are used.

Preferably the α,β-unsaturated ether monomer is present from 1 to 30% by weight, particularly preferably from 7 to 15%, provided that the ratio of (meth)acrylate monomer to α,β-unsaturated ether monomer is between 2:1 and 15:1.

Preferably the α,β-unsaturated ether monomer is a vinyl ether monomer. Particularly preferably the vinyl ether is selected from triethylene glycol divinyl ether, diethylene glycol divinyl ether, 1,4-cyclohexanedimethanol divinyl ether, ethylene glycol monovinyl ether and mixtures thereof. Preferably the composition contains a vinyl ether monomer and a multifunctional acrylate.

In addition to the monomers described above, the compositions include a photoinitiator, which, under irradiation by ultraviolet light, initiates the polymerization of the monomers. Preferred are photoinitiators which produce free radicals on irradiation (free radical photoinitiators) such as, for example, benzophenone, 1-hydroxycyclohexyl phenyl ketone, 2-benzyl-2-dimethylamino-(4-morpholinophenyl) butan-1-one, benzil dimethylketal, bis(2,6-dimethylbenzoyl)-2,4,4-trimethylpentylphosphine oxide or mixtures thereof. Such photoinitiators are known and commercially available such as, for example, under the trade names Irgacure, Darocur (from Ciba) and Lucerin (from BASF).

Preferably the photoinitiator is present from 1 to 20% by weight, preferably from 4 to 10% by weight, of the ink.

The ink-jet ink of the present invention also includes a colouring agent, which may be either dissolved or dispersed in the liquid medium of the ink. Preferably the colouring agent is a dispersible pigment, of the types known in the art and commercially available such as, for example, under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used. The total proportion of pigment present is preferably from 0.5 to 15% by weight, more preferably from 1 to 5% by weight.

Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

The present invention also provides a method of ink-jet printing using the above-described ink.

The ink of the present invention is preferably cured by ultraviolet irradiation and is suitable for application by ink-jet printing.

We have found that this ink-jet ink unexpectedly exhibits a desirable low viscosity (preferably less than 100 mPas, more preferably less than 50 mPas and most preferably less than 25 mPas at 25° C.). Accordingly, it is not usually necessary to use monofunctional (meth)acrylate monomers, which generally decrease cure speed, although they are not precluded. However, the ink may, for example, contain a multifunctional (meth)acrylate and a vinyl ether as well as a lesser amount (e.g. 1-15% by weight) of monofunctional (meth)acrylate.

(Meth)acrylate is intended herein to have its standard meaning, i.e. acrylate and/or methacrylate.

The inks of the invention may be prepared by known methods such as, for example, stirring with a high-speed water-cooled stirrer, or milling on a horizontal bead-mill.

EXAMPLES

The invention will now be described, by way of example, with reference to the following examples (parts given are by weight). Example 1 is a magenta UV ink-jet ink Examples 2 to 11 are cyan UV ink-jet. These inks use combinations of alternative multifunctional acrylates and methacrylates to demonstrate the advantage conferred by the use of α,β-unsaturated ethers.

Example 1

The following components were mixed in the order given on a high-speed water-cooled stirrer:

| | |
|---|---|
| Propoxylated neopentylglycol diacrylate | 69.82 parts |
| Actilane 505 (wetting resin from Akcros) | 1.56 parts |
| Solsperse 32000 (dispersant from Avecia) | 1.25 parts |
| Hostaperm E5BO2 (pigment from Hoechst) | 3.60 parts |
| Genorad 16 (stabiliser from Rahn AG) | 0.12 parts |
| Rapi-cure DVE-3 (difunctional vinyl ether from ISP Europe) | 10.0 parts |
| Luxirin TPO (photoinitiator from BASF) | 8.6 parts |
| Benzophenone (photoinitiator) | 5.0 parts |
| Byk 307 (defoamer from BYK Chemie) | 0.05 parts |

The product was an ink having a viscosity of 22 mPas at 25° C. The ink was printed on to self-adhesive vinyl and irradiated by passing at 40 m/min under light from an iron-doped ultra-violet lamp of power 120 W/cm. The ink gave a print with good cure, adhesion and chemical resistance.

Example 2

The following components were mixed in the order given on a high-speed water-cooled stirrer:

| | |
|---|---|
| Hexanediol diacrylate | 1.93 parts |
| Actilane 505 (wetting resin from Akcros) | 0.67 parts |
| Solsperse 32000 (dispersant from Avecia) | 0.45 parts |
| Solsperse 5000 (dispersant from Avecia) | 0.05 parts |
| Genorad 16 | 0.05 parts |
| Irgalite Blue GLVO (blue pigment from Ciba) | 1.35 parts |
| Propoxylated neopentylglycol diacrylate | 75 parts |
| Rapi-cure DVE-3 (difunctional vinyl ether from ISP Europe) | 10 parts |
| Luxirin TPO (photoinitiator from BASF) | 8.0 parts |
| Benzophenone (photoinitiator) | 2.0 parts |
| Byk 307 (defoamer from BYK Chemie) | 0.5 parts |

The product was an ink having a viscosity of 18.4 mPas at 25° C. The ink was printed on to self-adhesive vinyl and exposed by passing at 40 m/min under light from an iron-doped ultraviolet lamp of power 120 W/cm. As in Example 1, the ink gave a print with good cure, adhesion and chemical resistance.

Example 3

| | |
|---|---|
| Sartomer 350 (UV diluent from Cray Valley) | 59.4 parts |
| Solsperse 32000 (dispersant from Avecia) | 0.40 parts |
| Irgalite Blue (pigment from Ciba) | 3.60 parts |
| Genorad 16 | 0.05 parts |
| Rapi-cure DVE-3 (difunctional vinyl ether from ISP Europe) | 20.0 parts |
| Lucirin TPO (photoinitiator from BASF) | 8.5 parts |
| Benzophenone (photoinitiator) | 4.0 parts |
| Irgacure 184 (photoinitiator from Ciba) | 4.0 parts |
| Byk 307 (defoamer from BYK Chemie) | 0.05 parts |

Sartomer 350 is trimethylolpropane trimethacrylate which is a multifunctional methacrylate. The product was an ink having a viscosity of 19.6 mPas at 25° C. The ink was printed on to self-adhesive vinyl and exposed by passing at 20 m/min under light from an iron-doped ultraviolet lamp of power 120 W/cm. As in Example 1, the ink gave a print with good cure, adhesion and chemical resistance.

Example 4

| | |
|---|---|
| Actilane 421 (UV monomer from Akcros) | 51.4 parts |
| Photomer 2017 (UV diluent from EChem) | 20.0 parts |
| Solsperse 32000 (dispersant from Avecia) | 0.40 parts |
| Irgalite Blue (pigment from Ciba) | 3.60 parts |
| Genorad 16 | 0.05 parts |
| Rapi-cure DVE-3 (difunctional vinyl ether from ISP Europe) | 8.0 parts |
| Lucirin TPO (photoinitiator from BASF) | 8.5 parts |
| Benzophenone (photoinitiator) | 4.0 parts |
| Irgacure 184 (photoinitiator from Ciba) | 4.0 parts |
| Byk 307 (defoamer from BYK Chemie) | 0.05 parts |

Actilane 421 is propoxylated neopentylglycol diacrylate and Photomer 2017 is hexanedioldimethacrylate providing an acrylate/methacrylate combination The product was an ink having a viscosity of 5.7 mPas at 25° C. The ink was printed on to self-adhesive vinyl and exposed by passing at 20 m/min under light from an iron-doped ultraviolet lamp of power 120 W/cm. As in Example 1, the ink gave a print with good cure, adhesion and chemical resistance.

Example 5

| | |
|---|---|
| Actilane 421 (UV monomer from Akcros) | 51.4 parts |
| Sartomer 339 (UV diluent from Cray Valley) | 20.0 parts |
| Solsperse 32000 (dispersant from Avecia) | 0.40 parts |
| Irgalite Blue (pigment from Ciba) | 3.60 parts |
| Genorad 16 | 0.05 parts |
| Rapi-cure DVE-3 (difunctional vinyl ether from ISP Europe) | 8.0 parts |
| Lucirin TPO (photoinitiator from BASF) | 8.5 parts |
| Benzophenone (photoinitiator) | 4.0 parts |
| Irgacure 184 (photoinitiator from Ciba) | 4.0 parts |
| Byk 307 (defoamer from BYK Chemie) | 0.05 parts |

Actilane 421 is propoxylated neopentylglycol diacrylate and Sartomer 339 is phenoxy ethyl acrylate providing a multifunctional/monofunctional acrylate combination. The product was an ink having a viscosity of 13.6 mPas at 25° C. The ink was printed on to self-adhesive vinyl and exposed by passing at 40 m/min under light from an iron-doped ultraviolet lamp of power 120 W/cm. As in Example 1, the ink gave a print with good cure, adhesion and chemical resistance.

Examples 6-8 use Actilane 422 which is dipropyleneglycol diacrylate and vary the α,β-unsaturated ether.

Example 6

| | |
|---|---|
| Actilane 422 (UV diluent from Ackros) | 69.4 parts |
| Solsperse 32000 (dispersant from Avecia) | 0.40 parts |
| Irgalite Blue (pigment from Ciba) | 3.60 parts |
| Genorad 16 | 0.05 parts |
| Rapi-cure CHVE (difunctional vinyl ether from ISP Europe) | 10.0 parts |
| Lucirin TPO (photoinitiator from BASF) | 8.5 parts |
| Benzophenone (photoinitiator) | 4.0 parts |
| Irgacure 184 (photoinitiator from Ciba) | 4.0 parts |

Byk 307 (defoamer from BYK Chemie) 0.05 parts

Rapi-Cure CHVE is the divinyl ether of 1,4-cyclohexane dimethanol The product was an ink having a viscosity of 14.3 mPas at 25° C. The ink was printed on to self-adhesive vinyl and exposed by passing at 40 m/min under light from an iron-doped ultraviolet lamp of power 120 W/cm. As in Example 1, the ink gave a print with good cure, adhesion and chemical resistance.

Example 7

| | |
|---|---|
| Actilane 422 (UV diluent from Ackros) | 69.4 parts |
| Solsperse 32000 (dispersant from Avecia) | 0.40 parts |
| Irgalite Blue (pigment from Ciba) | 3.60 parts |
| Genorad 16 | 0.05 parts |
| Ethyl-1 Propenyl ether (from Aldrich) | 10.0 parts |
| Lucirin TPO (photoinitiator from BASF) | 8.5 parts |
| Benzophenone (photoinitiator) | 4.0 parts |
| Irgacure 184 (photoinitiator from Ciba) | 4.0 parts |
| Byk 307 (defoamer from BYK Chemie) | 0.05 parts |

The product was an ink having a viscosity of 11.3 mPas at 25° C. The ink was printed on to self-adhesive vinyl and exposed by passing at 40 m/min under light from an iron-doped ultraviolet lamp of power 120 W/cm. As in Example 1, the ink gave a print with good cure, adhesion and chemical resistance.

Example 8

| | |
|---|---|
| Actilane 422 (UV diluent from Ackros) | 69.4 parts |
| Solsperse 32000 (dispersant from Avecia) | 0.40 parts |
| Irgalite Blue (pigment from Ciba) | 3.60 parts |
| Genorad 16 | 0.05 parts |
| 2-Cyclopenten-1-yl ethyl (from Aldrich) | 10.0 parts |
| Lucirin TPO (photoinitiator from BASF) | 8.5 parts |
| Benzophenone (photoinitiator) | 4.0 parts |
| Irgacure 184 (photoinitiator from Ciba) | 4.0 parts |
| Byk 307 (defoamer from BYK Chemie) | 0.05 parts |

The product was an ink having a viscosity of 11.3 mPas at 25° C. The ink was printed on to self-adhesive vinyl and exposed by passing at 40 m/min under light from an iron-doped ultraviolet lamp of power 120 W/cm. As in Example 1 the ink gave a print with good cure, adhesion and chemical resistance.

Comparative Example 1

The following components were mixed in the order given on a high-speed water-cooled stirrer:

| | |
|---|---|
| Propoxylated neopentylglycol diacrylate | 79.82 parts |
| Actilane 505 (wetting resin from Akcros) | 1.56 parts |
| Solsperse 32000 (dispersant from Avecia) | 1.25 parts |
| Hostaperm E5BO2 (pigment from Hoechst) | 3.60 parts |
| Genorad 16 (stabiliser from Rahn AG) | 0.12 parts |
| Lucirin TPO (photoinitiator from BASF) | 8.6 parts |
| Benzophenone (photoinitiator) | 5.0 parts |
| Byk 307 (defoamer from BYK Chemie) | 0.05 parts |

This ink is as Example 1 but with the vinyl ether replaced by additional propoxylated neopentylglycol diacrylate.

The product was an ink having a viscosity of 46.8 mPas at 25° C. This viscosity is too high for use in a majority of commercially available ink-jet printing heads. The ink was coated onto self-adhesive vinyl using a wire wound bar applicator and irradiated by passing at 40 m/min under light from an iron-doped ultra-violet lamp of power 120 W/cm. When the ink was compared with the ink from Example 1 the cured film showed poorer adhesion and chemical resistance.

Comparative Example 2

The following components were mixed in the order given on a high-speed water-cooled stirrer:

| | |
|---|---|
| Propoxylated neopentylglycol diacrylate | 69.82 parts |
| ODA (octyl/decyl acrylate from UCB) | 10.00 parts |
| Actilane 505 (wetting resin from Akcros) | 1.56 parts |
| Solsperse 32000 (dispersant from Avecia) | .25 parts |
| Hostaperm E5BO2 (pigment from Hoechst) | .60 parts |
| Genorad 16 (stabiliser from Rahn AG) | 0.12 parts |
| Lucirin TPO (photoinitiator from BASF) | .6 parts |
| Benzophenone (photoinitiator) | 5.0 parts |
| Byk 307 (defoamer from BYK Chemie) | 0.05 parts |

This ink is as Example 1 but with the vinyl ether replaced by a mono-functional monomer octyl/decyl acrylate.

The product was an ink having a viscosity of 22 mPas at 25° C. This viscosity is satisfactory for commercially available ink-jet printing heads, but when the ink was coated onto self-adhesive vinyl using a wire wound bar applicator and irradiated by passing at 40 m/min under light from an iron-doped ultra-violet lamp of power 120 W/cm the cured film showed poorer adhesion and chemical resistance, compared with Example 1.

The invention claimed is:

1. An ink jet ink which is essentially free of water and/or volatile organic solvents, including at least one multifunctional (meth)acrylate monomer, at least one $\alpha,\beta$-unsaturated ether monomer, at least one radical photoinitiator and at least one dispersible pigment, wherein the ink includes, by weight, from 2 to 15 parts of multifunctional (meth)acrylate monomer to 1 part of $\alpha,\beta$-unsaturated ether monomer, the ink having a viscosity of less than 50 mPas at 25° C. and wherein the $\alpha,\beta$-unsaturated ether monomer is present in an amount from 1 to 30% by weight of the ink.

2. An ink jet ink as claimed in claim 1, wherein the multifunctional (meth)acrylate monomer is present in an amount from 50 to 95% by weight of the ink.

3. An ink jet ink as claimed in claim 1 or 2, wherein the ink is essentially free from monofunctional (meth) acrylate monomers.

4. The ink jet ink of claim 2 wherein the multi-functional (meth) acrylate monomer is an alkaline glycol di(meth) acrylate and the $\alpha,\beta$-unsaturated ether is a glycol divinyl ether and the dispersible pigment is present from 1 to 20% by weight of the ink.

5. The ink-jet ink of claim 4 which further comprises an oligomer.

6. An ink jet ink as claimed in claim 3, wherein the photoinitiator is a free radical photoinitiator, selected from benzophenone, 1-hydroxycyclohexyl phenyl ketone, 2-benzyl-2-dimethylamino-(4-morpholinophenyl)butan-1-one, benzil dimethylketal, bis(2,6-dimethylbenzoyl)-2,4,4-trimethylpentylphosphine oxide or mixtures thereof.

7. An ink jet ink as claimed in claim 6, wherein the photoinitiator is present from 1 to 20% by weight of the ink.

8. An ink-jet ink as claimed in claim 6, wherein the dispersible pigment is present from 0.5 to 15% by weight of the ink.

9. An ink jet ink as claimed in claim 3, wherein the photoinitiator is present from 1 to 20% by weight of the ink.

10. An ink-jet ink as claimed in claim 9, wherein the dispersible pigment is present from 0.5 to 15% by weight of the ink.

11. An ink-jet ink as claimed in claim 3, wherein the dispersible pigment is present from 0.5 to 15% by weight. of the ink.

12. A method of ink jet printing, wherein the method uses the ink jet ink as claimed in claim 3.

13. An ink jet ink as claimed in claim 1, wherein the vinyl ether is selected from triethylene glycol divinyl ether, diethylene glycol divenyl ether, 1,4-cyclohexanedimethanol divinyl ether, ethylene glycol monovinyl ether and mixtures thereof.

14. An ink jet ink as claimed in claim 13, wherein the photoinitiator is a free radical photoinitiator, selected from benzophenone, 1-hydroxycyclohexyl phenyl ketone, 2-benzyl-2-dimethylamino-(4-morpholinophenyl)butan-1-one, benzil dimethylketal, bis(2,6-dimethylbenzoyl)-2,4,4-trimethylpentylphosphine oxide or mixtures thereof.

15. An ink jet ink as claimed in claim 13, wherein the photoinitiator is present from 1 to 20% by weight of the ink.

16. An ink-jet ink as claimed in claim 13, wherein the dispersible pigment is present from 0.5 to 15% by weight of the ink.

17. An ink jet ink as claimed in claim 1, wherein the photoinitiator is a free radical photoinitiator, selected from benzophenone, 1-hydroxycyclohexyl phenyl ketone, 2-benzyl-2-dimethylamino-(4-morpholinophenyl)butan-1-one, benzil dimethylketal, bis(2,6-dimethylbenzoyl)-2,4,4-trimethylpentylphosphine oxide or mixtures thereof.

18. An ink jet ink as claimed in claim 1, wherein the photoinitiator is present from 1 to 20% by weight of the ink.

19. An ink-jet ink as claimed in claim 1, wherein the dispersible pigment is present from 0.5 to 15% by weight of the ink.

* * * * *